Sept. 19, 1933.  A. GIESE ET AL  1,927,119
HOLDER FOR COW TAILS
Filed Jan. 31, 1933

Inventor
Albert Giese,
Ella Giese,

By Clarence A. O'Brien
Attorney

Patented Sept. 19, 1933

1,927,119

UNITED STATES PATENT OFFICE 1,927,119

HOLDER FOR COW-TAILS

Albert Giese and Ella Giese, Benton Harbor, Mich., assignors to said Albert Giese and said Ella Giese, as joint owners with right of survivorship Application January 31, 1933. Serial No. 654,500

2 Claims. (Cl. 119—105)

This invention relates to a device for holding the tail of a cow when the cow is being milked, the general object of the invention being to provide a clamp which can be easily and quickly attached to the cow's tail and fastened by ropes to a support so that the cow is prevented from switching its tail as it is being milked.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1:
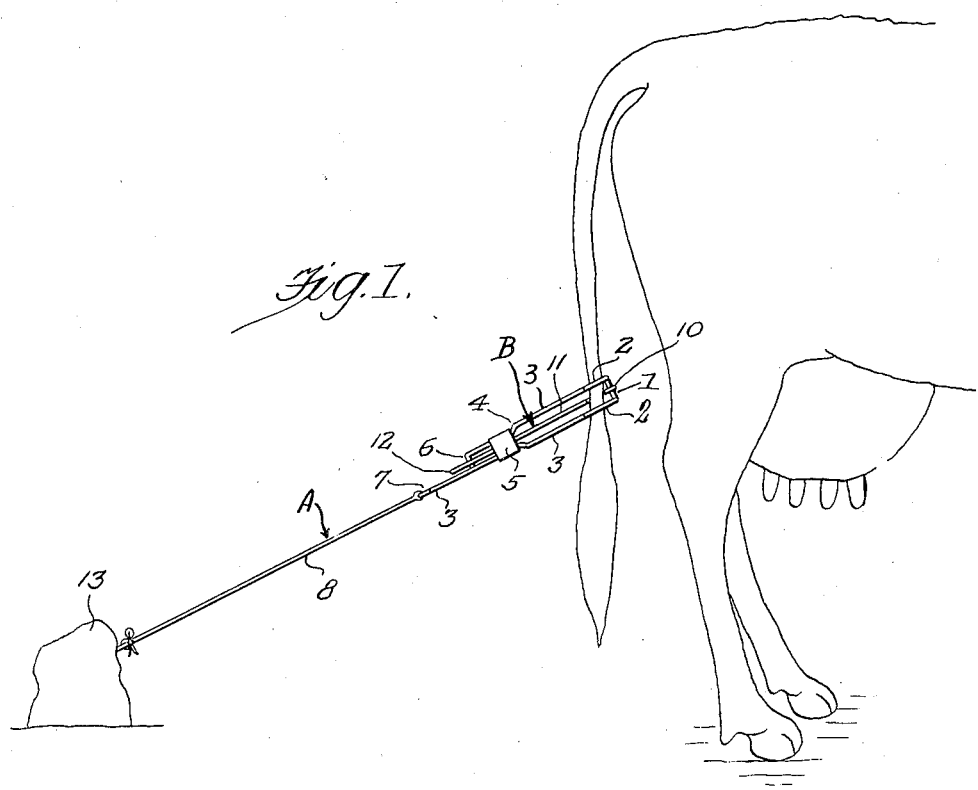
Figure 1 is a view showing the device in use.
Figure 2:
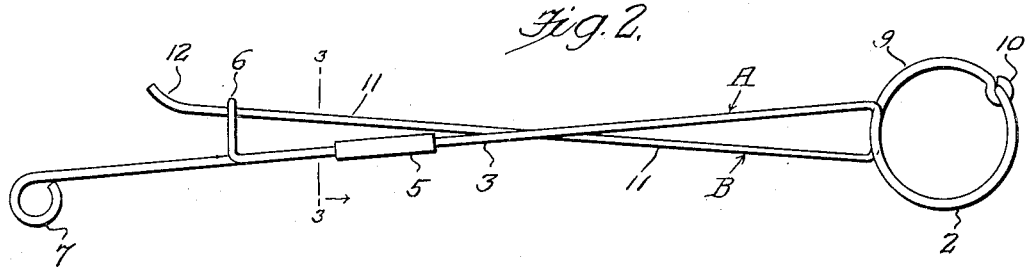
Fig. 2 is a top plan view of the device.
Figure 3:
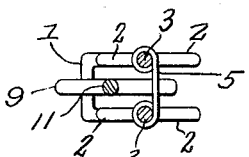
Fig. 3 is a section on line 3—3 of Fig. 2.

As shown in these views, the device comprises the members A and B, each of which is formed of spring wire and the member A is formed of the single piece of material bent to provide the straight part 1, the two substantially semi-circular parts 2 which are connected by the straight part 1 and the two limbs 3 having their inner ends connected to the parts 2. These limbs are bent as shown at 4 so that their outward portions lie close together and these portions are connected together by a small plate 5 which has its edges bent around said portions. One of said members 3 is shorter than the other, and the end of this short member is bent to provide a hook 6, and the long member is bent to provide an eye 7 to which one end of a rope 8 is connected. The member B is of single construction and is formed with a substantially semi-circular part 9 which has an eye 10 at its free end looped around the straight part 1 of the member A so that the two members are hingedly connected together at their looped ends and said member B is also formed with a straight part 11 which extends between the parts 3 of the member A, over the plate 5 and has its free end slightly bent as at 12, the end of this straight part 11 being adapted to engage with the hook 6 to hold the parts in closed position with the curved or semi-circular portions 2 and 9 passing around the cow's tail as shown in Fig. 1.

By pressing upon the part 12 the portion 11 may be released from the hook to permit the members A and B to be swung apart so that the cow's tail can be placed between the semi-circular portions or removed therefrom.

Thus it will be seen by attaching the device to the cow's tail as shown in Fig. 1 and then attaching the free end of the rope 8 to any suitable stationary member which is shown at 13 in Fig. 1, the cow is prevented from switching its tail which causes much annoyance during the milking operation and prevents dirt, dust and the like from being thrown into the milk by the switching of the tail.

The device can be clamped to the cow's tail without necessitating the operator's hand touching the tail, and it will permit the cow to raise its tail. The device being made of spring wire, will fit different parts of the cow's tail, whether it is applied to the large part of the tail or the smaller part and if the holder should prove too large it can be made smaller by simply bending those portions of the wires which form the loop which fits around the cow's tail. The invention is practical in that it makes for sanitation in milking, lessens the nuisance and annoyance of the switching tail during the milking process, and is self-adjusting and comprises only two movements of the parts and is very simple in its operation.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described our invention, what we claim as new is:—

1. A device for holding a cow's tail comprising a double member, each portion of which consists of a shank, a substantially semi-circular member and a straight portion connecting the two semi-circular portions together, means for connecting the outer portions of the shanks together in spaced relation, one shank having a hook thereon and the other shank being extended and having means for attaching a rope thereto, a single member having an eye at one end receiving the straight portion of the other member, and a semi-circular portion for forming a clamp with the semi-circular portions of the first member, said single member also having a shank engaging the hook of the other member to hold the semi-circular portions in clamping relation.

2. A device for holding a cow's tail comprising a pair of members formed of spring wire and each having a substantially semi-circular portion at one end thereof, the remaining portion of each member being substantially straight and of considerable length to form a shank, each shank being connected to one end of the semi-circular part, said semi-circular portions being oppositely arranged with the free ends of one semi-circular portion hingedly connected to the free end of the other semi-circular portion and means for detachably connecting the shanks together to hold the semi-circular portions around the cow's tail.

ALBERT GIESE.
ELLA GIESE.